United States Patent
Elson et al.

(10) Patent No.: US 10,255,921 B2
(45) Date of Patent: Apr. 9, 2019

(54) MANAGING DIALOG DATA PROVIDERS

(71) Applicant: Google LLC, Mountain View, CA (US)

(72) Inventors: David Kliger Elson, Brooklyn, NY (US); David P. Whipp, San Jose, CA (US); Shir Judith Yehoshua, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/815,794

(22) Filed: Jul. 31, 2015

(65) Prior Publication Data

US 2017/0032791 A1    Feb. 2, 2017

(51) Int. Cl.
| | |
|---|---|
| G10L 15/08 | (2006.01) |
| G10L 15/22 | (2006.01) |
| G10L 17/22 | (2013.01) |
| G06F 17/30 | (2006.01) |

(52) U.S. Cl.
CPC ........ *G10L 17/22* (2013.01); *G06F 17/30654* (2013.01)

(58) Field of Classification Search
USPC ........ 704/9, 231, 235, 246, 257, 270, 270.1, 704/275
See application file for complete search history.

(56) References Cited

U.S. PATENT DOCUMENTS

| | | | |
|---|---|---|---|
| 6,604,075 B1 | 8/2003 | Brown et al. | |
| 6,615,172 B1 | 9/2003 | Bennett et al. | |
| 7,257,537 B2 | 8/2007 | Ross et al. | |
| 7,761,499 B2 * | 7/2010 | Hodjat | G06N 5/043 704/257 |
| 7,869,998 B1 | 1/2011 | Di Fabrizio et al. | |
| 8,200,485 B1 | 6/2012 | Lee | |
| 8,566,102 B1 | 10/2013 | Bangalore et al. | |
| 8,577,671 B1 * | 11/2013 | Barve | G06F 17/30522 704/9 |
| 9,070,366 B1 * | 6/2015 | Mathias | G06F 17/279 |
| 9,431,008 B2 * | 8/2016 | Robichaud | G10L 15/18 |
| 2004/0066401 A1 | 4/2004 | Bushey et al. | |

(Continued)

FOREIGN PATENT DOCUMENTS

| | | |
|---|---|---|
| RU | 2012135502 | 2/2014 |
| WO | WO 2011/088053 | 7/2011 |

OTHER PUBLICATIONS

Bor-shen Lin et al, "A distributed architecture for cooperative spoken dialogu agents with coherent dialogue state and history", In Proc. ASRU-99.*

(Continued)

*Primary Examiner* — Olujimi A Adesanya
(74) *Attorney, Agent, or Firm* — Fish & Richardson P.C.

(57) ABSTRACT

Methods, systems, and apparatus, including computer programs encoded on a computer storage medium, for managing dialogs. In one aspect, a method includes receiving a request associated with a task from a user device; submitting the request to each of a plurality of distinct data providers; receiving a plurality of suggested dialog responses from two or more of the data providers; scoring the one or more suggested dialog responses based on one or more scoring factors; determining a particular dialog response to provide to the user based on the scoring; and providing the determined dialog response to the user device.

21 Claims, 2 Drawing Sheets

(56) References Cited

U.S. PATENT DOCUMENTS

| | | | |
|---|---|---|---|
| 2004/0162724 A1* | 8/2004 | Hill | G10L 15/1822 704/231 |
| 2007/0033005 A1* | 2/2007 | Cristo | G06F 17/279 704/9 |
| 2007/0050191 A1* | 3/2007 | Weider | G06F 17/30864 704/275 |
| 2008/0091406 A1* | 4/2008 | Baldwin | G10L 15/22 704/4 |
| 2008/0126091 A1* | 5/2008 | Clark | G10L 15/22 704/246 |
| 2009/0150156 A1* | 6/2009 | Kennewick | G06Q 30/0261 704/257 |
| 2010/0082652 A1* | 4/2010 | Jones | G06Q 30/02 707/758 |
| 2011/0131045 A1* | 6/2011 | Cristo | G06F 17/279 704/249 |
| 2012/0253790 A1* | 10/2012 | Heck | G06F 17/30867 704/9 |
| 2013/0346886 A1* | 12/2013 | Cauchois | H04L 51/046 715/758 |
| 2014/0257792 A1 | 9/2014 | Gandrabur et al. | |
| 2015/0079554 A1* | 3/2015 | Lee | G09B 7/00 434/157 |

OTHER PUBLICATIONS

International Search Report and Written Opinion in International Application No. PCT/US2016/044864, dated Oct. 7, 2016, 12 pages.

RU Office Action issued in Russian Application No. 2017142336, dated Nov. 8, 2018, 5 pages (English translation).

\* cited by examiner

MANAGING DIALOG DATA PROVIDERS

BACKGROUND

This specification relates to dialogs.

Conventional mobile devices can include software to respond to speech of a user of the mobile device. The speech can typically include instructions to the mobile device to call a phone number, text a phone number, or search for information on the mobile device or the internet. The software can provide audio output from the mobile device confirming the instructions. The mobile device can provide the received speech to a server system for processing and receiving information identifying operations to perform.

SUMMARY

This specification describes technologies relating to managing dialogs including moderating between different data providers. In general, one innovative aspect of the subject matter described in this specification can be embodied in methods that include the actions of receiving a request associated with a task from a user device; submitting the request to each of a plurality of distinct data providers; receiving one or more suggested dialog responses from one or more of the data providers; scoring the one or more suggested dialog responses based on one or more scoring factors; determining a particular dialog response to provide to the user based on the scoring; and providing the selected dialog response to the user device.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method includes: updating a state of a dialog based on the selected dialog response. The received request is a voice input and wherein the method comprises converting the voice input request to text prior to submitting the request to the plurality of data providers. The method further includes: determining if the dialog requires further responses from the user device and in response to determining that no further responses are required, completing the task requested by the user. Each data provider independently analyzes the request according to a corresponding data model. In response to determining that none of the respective scores for the plurality of suggested dialog responses satisfy a threshold amount, synthesizing a response to provide to the user device to ascertain the user intent. Determining a particular dialog response to provide to the user based on the scoring includes disqualifying a suggested dialog response having a score that is lower than a threshold amount and also disqualifying all suggested dialog responses that refer to the suggested dialog response Particular embodiments of the subject matter described in this specification can be implemented so as to realize one or more of the following advantages. Dialog management is improved for responding to tasks by moderating between different data providers that can respond to a user input. In particular, the different data providers having different strengths and weaknesses can be leveraged. This allows specialized data providers while also providing flexibility in the types of user inputs that can be interpreted. Additionally, dialog management can allow receiving parallel responses from the different data providers and optionally aggregating the received responses. Additionally, data providers can be heterogeneous with respect to implementation, e.g., they may be generated by different vendors or be built using different technologies, or be accessible through different networks (like local vs. far-flung). As long as each data provider provides data using the prescribed interface, the system can combine their data into a unified dialog response.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Users can provide voice instructions to a device to perform a particular task, for example, generating a calendar item, placing a call or text, or searching for particular information. Performing the task, by the device or by a system in communication with the device, can be driven by a conversational dialog that asks the user questions for one or more values needed to complete the task, analogous to filling out fields of a form.

For example, a sample dialog for a calendar task can be:
User: [create an alarm]
Device/system: What time would you like your alarm?
User: [3:00 pm]
Device/system: I've generated an alarm for 3:00 pm.

In response to the user input of the command to create the alarm, the system interprets the command as requesting a task to set an alarm at a particular time. In particular, a data provider for performing tasks can interpret the received voice input and direct a specific dialog toward information necessary to complete the task, e.g., requesting a time for the alarm.

In another example dialog, the user can be seeking particular information:
User: [When does the Giants game start?]
Device/system: Do you mean the San Francisco Giants or the New York Giants?

Here, the system understands the question from the user as a sports scheduling query, but there is ambiguity as to which "Giants" the user means. The dialog response requests a clarification of which "Giants" sports team the user is referring to. Once clarified, the dialog can continue to provide scheduling information, for example, as identified by a search system.

In some cases, the user input can change from one type of task to potentially another type of task depending on how the dialog system interprets the voice input. For example:

User: [Set an alarm]
Device/system: What time would you like your alarm?
User: [When does the Giants game start?]

In this example, the user's second response can be interpreted in more than one way depending on which data provider is triggered by the voice input. For example, a tasks data provider can interpret voice inputs related to creating an alarm, but not consider the second input on the Giants game to be a noisy or nonsense response because it doesn't relate to the expected input for the alarm task dialog. However, another data provider that can interpret sports related voice inputs can process the Giants game schedule question. This specification describes techniques for moderating and combining dialog responses from multiple data providers.

Figure 1:
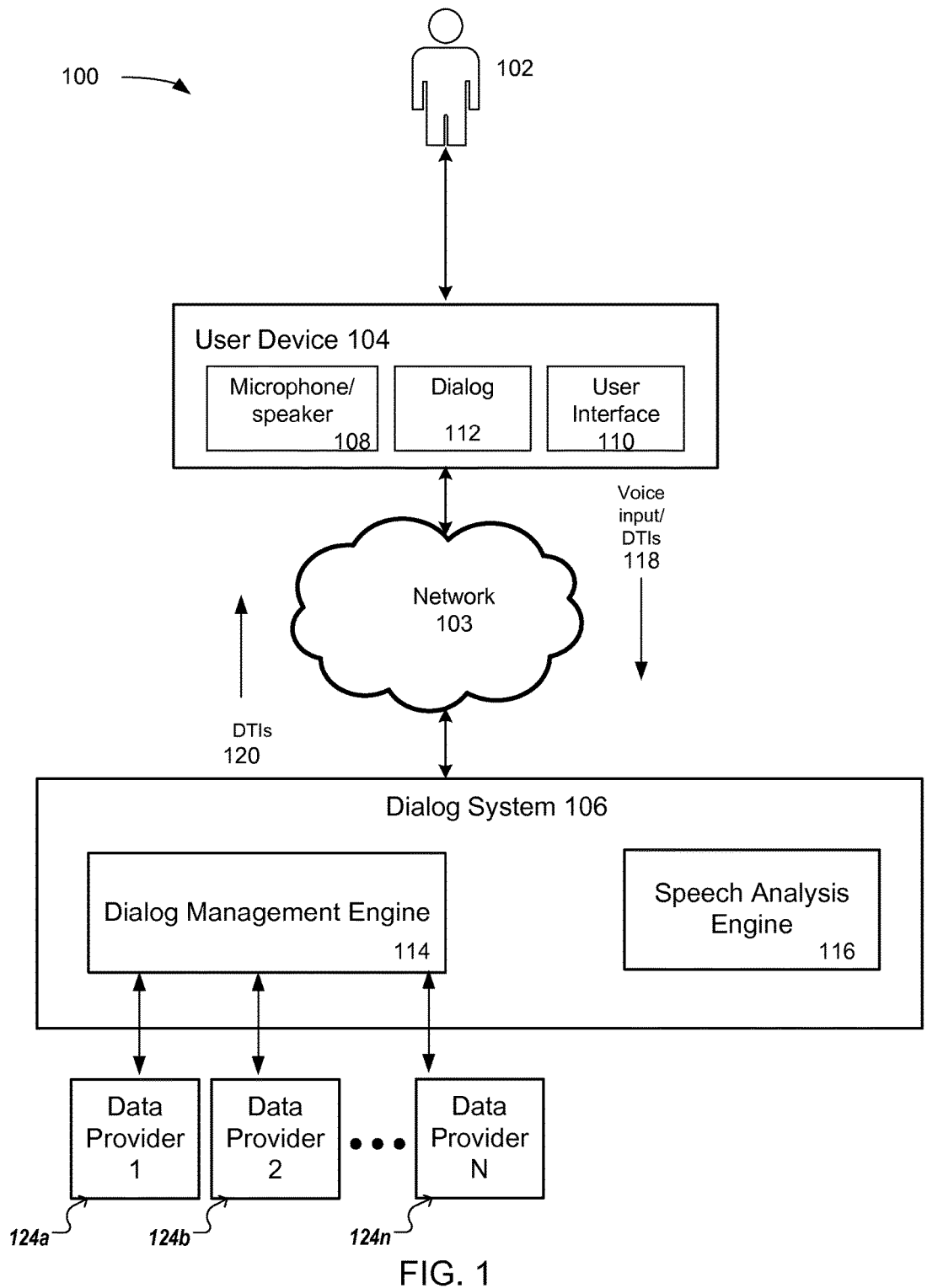
FIG. 1 is an example system for managing a dialog.

FIG. 1 is an example system 100 for managing a dialog. The system 100 includes a user 102, a user device 104, a dialog system 106, and multiple data providers 124a, 124b, to 124n. The user device 104 and the dialog system 106 care in communication though a network 103, e.g., the internet.

The user device 104 can be one of a number of suitable devices including a mobile device, a wearable computer, a tablet, a hybrid, a laptop, or desktop computer. The user device 104 can receive interactions, both verbal, e.g., voice inputs, and non-verbal from the user 102. In particular, the user device 104 includes a microphone 108 configured to receive voice inputs from the user 102. The user device 104 can also include one or more speakers configured to broadcast dialog questions in response to received user request. Only a single user device is shown for clarity. However, there can be many user devices associated with corresponding distinct users. Each of these user devices can be in communication with the dialog system 106 through the network 103.

The user device 104 further includes a user interface 110. The user interface 110 can present information to the user including some or all of content associated with a dialog in response to a user request. The dialog 112 defines a number of responses, e.g., questions for values, needed to perform a task requested by the user. Particular questions or other content of the dialog 112 can be presented to the user in a particular order, for example, though a sequence of audio questions broadcast by the one or more speakers or displayed in the user interface 110.

In some other implementations, the user device includes a speech analysis engine to convert received voice inputs to the microphone 108 into text prior to transmission to the dialog system 106.

The dialog system 106 can be one or more computing resources, e.g., one or more computing systems, or virtual machines executing on one or more computing systems, in communication with the user device 104 through the network 103. The dialog system 106 includes a dialog management engine 114 and a speech analysis engine 116.

The speech analysis engine 116 can use a suitable speech-to-text process to convert the received voice inputs 118 into a text string. In some implementations, the speech analysis engine 116 emits text that can be processed by one or more parsers to identify one or more meanings, e.g., by generating a parse tree. The meaning of the audio as converted to text can be used by one or more data providers to identify a particular task to perform in response to a received request.

The dialog management engine 114 manages one or more dialogs associated with a requested task. This includes maintaining a state of the dialog, e.g., what question is being answered, so that the speech analysis engine 116 can properly interpret received audio associated with the dialog based on the current context provided by the state. In addition, the dialog management engine 114 determines a response to an incoming voice input based on the state of the dialog as well as the interpretation of the voice input by one or more of the data providers 124a, 124b, and 124n, representing a data provider 1, data provider 2, and data provider N where N is some integer representing a total number of data providers that can provide input to the dialog system 106.

Each of these data providers 124a-n represents a backend system that is configured to independently interpret voice inputs according to a particular data model for that data provider. For example, a first data provider can be a tasks provider that has a data model configured to interpret voice queries related to particular tasks such as creating a calendar entry, setting an alarm, placing a telephone call, or generating a text message. The tasks data provider expects user inputs associated with particular tasks and recognizes voice inputs associated with those expected user inputs. A second data provider can be a sports provider that has a data model configured to interpret voice queries related to particular sports topics including teams and scores. Other data providers can include search data providers that are focused on particular types of information, e.g., local businesses, social networking information, or commercial data such as shopping opportunities.

In response to a voice input that is received from the user device 104 and processed by the voice analysis engine 116, one or more of the data providers 124 can interpret the received input and provide a dialog response to the dialog management engine 114. The dialog management engine 114 then determines which dialog response to provide to the user device 104. Different ways of responding are described in greater detail below.

Each data provider 124a-n suggests a dialog response based on the interpretation of a received input according to the data model of the corresponding data provider. The dialog response, and optionally other information such as an expected response from the user 102, can be encoded in a data structure according to a particular data format. In some implementations, this information is encoded in a protocol buffer referred to in this specification as a DialogTurnIntent ("DTI"). For convenience, DTI will be used throughout, but other suitable encoded data structures can be used.

For example, in a dialog for a task of composing an e-mail message, one question of the dialog can be a request for a subject of the e-mail. The tasks data provider can create a DTI where the question to the user is a prompt for a subject. The DTI is provided to the dialog management engine 114 and sent to the user device 104 where it can be presented to the user 102, for example, as a visual question in the user interface, e.g., "What is the subject?" or as an audio question emitted from the speakers e.g., "What would you like the subject to be?"

The dialog management engine 114 can send (120) more than one DTI to the user device 102. In particular, the DTIs can include not only the current prompt to the user, but other DTIs related to other fields necessary to complete the dialog for the requested task. For example, when the dialog management engine 114 sends the "prompt for subject" DTI it can also send a DTI for a subsequent question in the dialog, e.g., a "prompt for message body" DTI.

Figure 2:
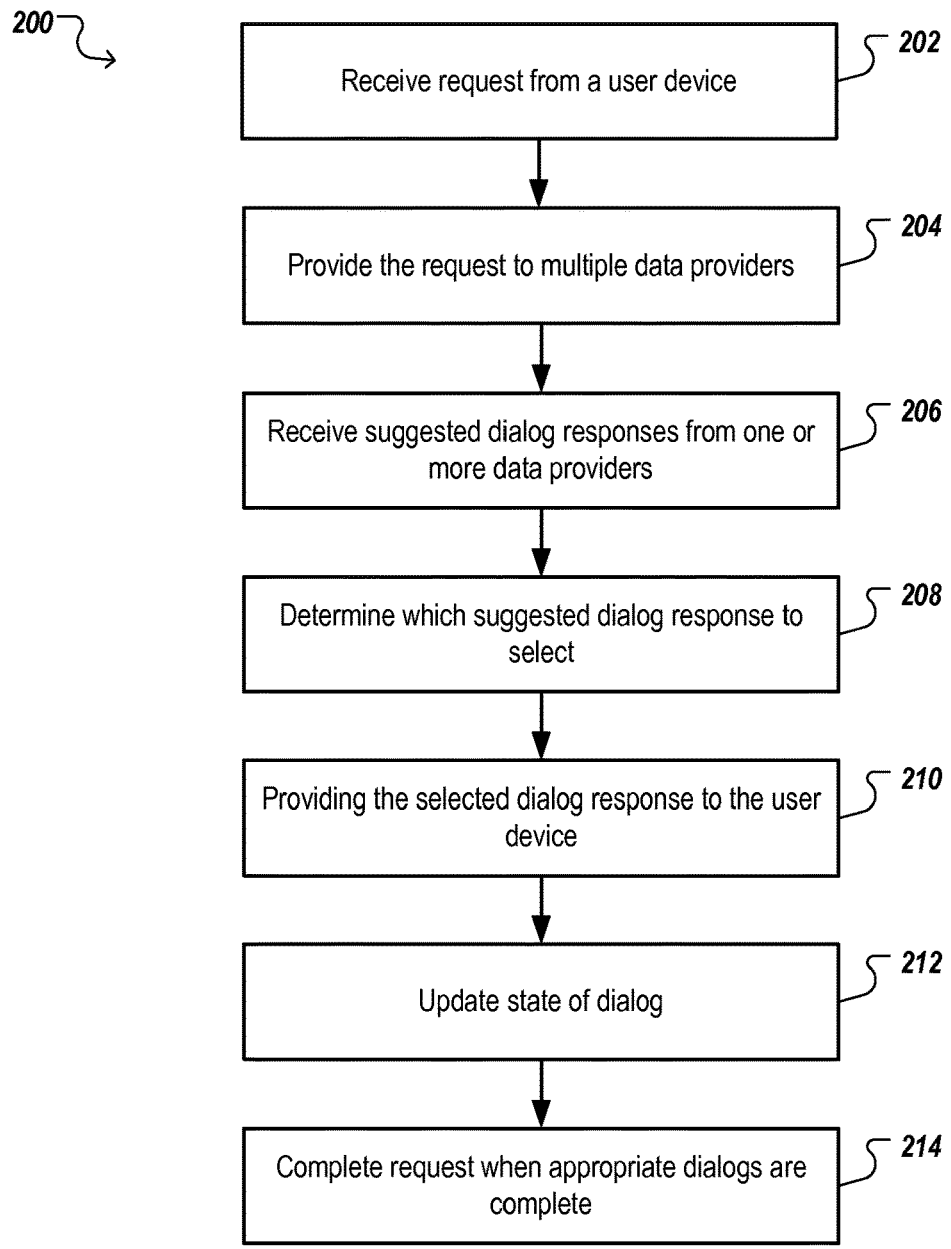
FIG. 2 is a flow diagram of an example process for managing a dialog.

FIG. 2 is a flow diagram of an example process 200 for managing a dialog. For convenience, the process 200 will be described as being performed by a system of one or more computers, located in one or more locations, and programmed appropriately in accordance with this specification. For example, a dialog system, e.g., the dialog system 106 of FIG. 1, appropriately programmed, can perform the process 200.

The system receives an input including a request (202). The request can be received as a voice input provided by a user to a user device or a manual input to the user device, e.g., user device 104 of FIG. 1 and transmitted to the system. In some implementations, a user voice input can be converted to text by the user device prior to being sent to the system. The task can be, for example, generating a calendar item, setting an alarm, generating an e-mail, placing a call or text, or searching for particular information.

The system provides the request to multiple data providers (204). Each data provider can be configured to interpret different types of requests using a particular data model. Thus, the received request can be interpreted differently by different data providers depending on how the request is processed according to the respective data models.

The system receives a suggested dialog response from one or more of the data providers (206). Each data provider independently analyzes the request according to a respective data model. The data model can include a model trained on a specific collection of data associated with a particular type of information or action. The request may trigger a response by some but not all data providers of the multiple data providers. Thus, a voice input request for a baseball game schedule may trigger a suggested dialog response from a data provider trained to provide sports related responses but not trigger a data provider trained to provide weather information because the voice input does not match an expected request associated with weather information. In some implementations, a data provider may provide a response for an unrecognized voice input, for example, indicating that the input was not understood and ask the user to repeat the response.

The one or more data providers can provide the suggested dialog response in the form of a DTI that includes the suggested response to provide to the user device.

In some implementations, each data provider is able to view the suggested dialog responses provided by other data providers. In response, a given data provider can modify or add suggested dialog responses based on the dialog responses of other data providers. For example, a task data provider can suggest a response that is based on the suggested response of a search data provider, e.g., suggesting a time to set an alarm based on a response from a search data provider providing a time for a sports game. Additionally, in some implementations, each data provider can provide multiple suggested dialog responses. For example, each response to can based on the context of a suggested response of another data provider as well as a response that ignores suggestions of other data providers.

The system determines which dialog response to select (208). In particular, the system analyzes all of the suggested dialog responses and determine which suggested dialog response is the most appropriate to select. The analysis is performed after receiving all of the individual suggestions from the data providers but before any dialog responses are sent to the user device. The system can score each suggested response based on one or more factors. Various factors can be used to score the suggested dialog responses to select including one or more of logs-based tuning of likely user intention, user personalization models, scores indicating the likelihood of each data provider's semantic interpretation, or an overall dialog strategy configuration that determines the balance between careful accordance and minimizing a number of questions asked as part of the dialog.

In some implementations, the data providers include confidence scores with their results. The confidence scores can be used to determine which suggested response to select. In some other implementations, other selection factors can include the length of the dialog conversation and the history of the dialog conversation. For example, if the user is asking the same question multiple times the data provider may not be providing the information the user is seeking and a different data provider can be selected instead.

In some implementations, a selection factor is a likelihood that the information being considered is something that a normal user would be interested in (as opposed to esoterica). For example, if there is no such sports team as Giants, we should consider that the user was misunderstood before doing a search for e.g., "giants that play".

In some implementations, a selection factor is a quality of the information being considered. The quality can be based, for example, on whether the data provider obtained the information from a structured source, e.g., official baseball schedule service, or an unstructured source, e.g., blogs by random people.

In some implementations, a selection factor is based on pragmatics and task planning. For example, if the system doesn't know what time either of the Giants teams play, the system shouldn't ask the user which Giants they mean, because the answer would not have any impact on the broader task.

In some implementations, a selection factor is derived based on relevance of the information being considered to the user query. For example, if the "Giants" were only an obscure team in a far off country, the system should consider them irrelevant.

In some implementations, a selection factor is based on whether a determination is made that the query is ambiguous enough that the system should ask the user to clarify their intention, without annoying them by asking dumb/obvious questions. The determination can be made, for example, based on geographic information about where the user is located, personalization, e.g., user history discussing SF Giants vs. NY Giants, or context e.g., only one of the teams has a game schedules soon.

In some implementations, if a particular suggested dialog response scores lowly based on these factors, e.g., the suggested dialog response fails to satisfy a particular threshold score, the dialog management engine can not only disqualify that suggested dialog response but also any other suggested dialog responses that refer to the suggested dialog response. In some implementations, if the scores from two or more data providers are not distinguishable by a specified threshold amount, the dialog management engine can generate an intent disambiguation question as the dialog response.

The system provides the selected dialog response to the user device (210) and updates a state of the dialog (212). The dialog response sent to the user device can include the DTI of the selected dialog response that indicates the response to be presented to the user on the user device. This response can be synthesized into a voice response or presented on a user interface of the user device. In some implementations, the response is sent along with additional information, for example, one or more search results associated with the dialog response. For example, if the dialog response is based on a data provider's search or relevant web pages, links to those web pages can be provided along with the dialog response.

The updated state of the dialog can be used to determine a next portion of the dialog to send in response to received user responses. Additionally, the updated state of the dialog can provide context to the analysis of a subsequent voice input received from the user device such that the voice input can be properly interpreted.

The system completes the request when appropriate dialogs are completed (214).

The system can determine whether there are additional values needed or whether the dialog is complete. If there are additional values needed one or more additional DTIs may be sent to the user device or the system may wait for additional responses from the user device. If there are no additional values needed, the system can complete the task, for example, by generating a calendar entry or e-mail message, or by providing particular requested information. The completed task can be sent to the user device for approval before being executed or can be automatically performed.

There are a number of different ways the system can interpret inputs based on the suggestions of the different data providers and the scoring applied. The following describes some example scenarios for interpreting a user input:

Scenario 1:
User: [Set an alarm]
System/device: What time would you like your alarm?
User: [What time does the Giants game start?]
In this example, the data providers can include a tasks provider, a sports provider, and a web answers provider. If the system determines that the dialog suggestions of the sports and web data providers are noisy, these responses should be disfavored and the task provider that was already triggered should govern the dialog. This can result in a response such as:
System/device: Sorry, I didn't get that. What time would you like your alarm?

Scenario 2:
In this scenario, the user is asking a side question because they want to watch the Giants game. The system has a higher confidence in the web answers this time as reflected in the score for the corresponding suggested dialog response and therefore it is selected over the sports provider and the task provider to create a blended dialog:
User: [Set an alarm]
System/device: What time would you like your alarm?
User: [What time does the Giants game start?]
System/device: Based on the results below, the Giants game begins today at 3 pm. Set your alarm for then?

Scenario 3:
Similar to scenario 2, except that the dialog management engine synthesizes a new question to determine whether the user meant to change topics or if they are still interested in the original task:
User: [Set an alarm]
System/device: What time would you like your alarm?
User: [What time does the Giants game start?]
System/device: Based on the results below, the Giants game begins today at 3 pm. Do you still want to set an alarm?

Scenario 4:
In scenario 4, the user is asking a side question because they want to watch the Giants game. Even though the web answer provider provides a time as a suggested answer, the system allows a sports provider's suggestion, which scored higher, to clear ambiguity and confirm the right entity. Maintaining the intent to set an alarm, the following blended dialog can occur:
User: [Set an alarm]
System/device: What time would you like your alarm?
User: [What time does the Giants game start?]
System/device: Do you mean the SF giants or the New York Giants?
User: [SF Giants]
System/device: Based on the results below, the SF Giants play at 3 pm. Set your alarm for then?

Scenario 5:
In this scenario, the user is changing the subject and no longer wants to set an alarm. Here, the dialog management engine is confident that the web answers provider identifying the time of the Giants game, which scores higher than the other suggested dialog responses and does not suggest an alarm that continues the prior task.
User: [Set an alarm]
System/device: What time would you like your alarm?
User: [What time does the Giants game start?]
System/device: Based on the results below, the Giants game begins today at 3 pm.

Scenario 6:
In this scenario the user is changing the subject and no longer wants to set an alarm. The dialog management engine uses the highest scoring suggestion of the sports data provider to clarify the entity and then the web answers to identify the time. No alarm is suggested.
User: [Set an alarm]
System/device: What time would you like your alarm?
User: [What time does the Giants game start?]
System/device: Do you mean the SF Giants or the New York Giants?
User: [SF Giants]
System/device: Based on the results below, the Giants game begins today at 3 pm.

Scenario 7:
In this scenario, the dialog management engine may synthesize a question to disambiguate whether the user is changing the subject or asking a side question. This may occur because two or more suggested responses scored too close to determine which one should be favored.
User: [Set an alarm]
System/device: What time would you like your alarm?
User: [What time does the Giants game start?]
System/device: Wait, do you want to finish setting up your alarm or are you trying to schedule your alarm around the game?

In each of these scenarios, the various data providers suggest one or more dialog responses based on the user input. Additionally, the data providers can suggest multiple dialog responses based on the suggested dialog responses of other data providers.

Referring to the example scenarios above, a tasks provider can provide a suggested dialog response of "sorry, I didn't get that. What time would you like your alarm?" This corresponds to scenario 1 above.

In response to the task provider becoming aware of a suggested dialog response was sent by a web answers provider, the tasks provider can generate another suggested dialog response that refers to the web answers suggested dialog response with additional content "set your alarm for then?" This corresponds to scenario 2 above.

In response to the task provider becoming aware of a suggested dialog response was sent by the web answers provider, the tasks provider can generate another suggested dialog response that refers to the web answers suggested dialog response with additional content "do you still want to set an alarm?" This corresponds to scenario 3 above.

In response to the task provider becoming aware of a suggested dialog response was sent by the sports data provider to disambiguate the entity, the tasks provider can generate another suggested dialog response that refers to the sports answers suggested dialog response with additional content "set your alarm for then?" This corresponds to scenario 4 above.

The various suggested dialog responses from each of the data providers are scored according to the one or more factors. Based on the scoring, the dialog management engine can then select an appropriate dialog response. Referring again to the example scenarios above, based on the respective scores that dialog management engine can:

A) Select of the suggested dialog response of the tasks provider (scenario 1)

B) Select an alternative suggested dialog response of the tasks provider and also accept the suggested dialog response of the web answers provider (scenario 2)

C) Select an alternative suggested dialog response of the tasks provider and also accept the alternative suggested dialog response of the web answers provider (scenario 3)

D) Select an alternative suggested dialog response of the tasks provider and also accept the suggested dialog response of the sports data provider (scenario 4)

E) Select the suggested dialog response of the web answers provider and drop the alarm state altogether (scenario 5)

F) Select the suggested dialog response of the sports data provider and drop the alarm state altogether (scenario 6)

G) Generate an entirely new suggested dialog response to ask the user for their intention (scenario 7). For example, if the scores from the data providers are not distinguishable by a threshold amount.

Elimination of a suggested dialog response can cascade to other suggested dialog responses that refer to it. Thus, if the suggested dialog response of the web answers provider has a disqualifying score, not only is scenario 5 eliminated, but also scenarios 2 and 3. In some implementations, geographic information can also be used in the scoring. For example, using the geographic information to indicate which Giants the user is referring to (San Francisco vs. New York), the sports data provider suggested response can be suppressed to eliminate not only scenario 6, but also scenario 4.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
receiving a request, from a user device, made by a user to perform a task, wherein the request comprises a voice input of a user of the user device;
determining a dialog associated with the task, wherein the dialog has a particular state;
submitting the voice input of the request to each of a plurality of distinct data providers, wherein each data provider is associated with a distinct data model configured to interpret particular types of voice inputs;
in response to the voice input, receiving a plurality of suggested dialog responses to the voice input from two or more of the data providers including a first data provider and a second data provider, wherein the first data provider determines whether to change a first suggested dialog response of the first data provider that is responsive to the voice input of the request based on a second suggested dialog response of the second data provider that is responsive to the voice input of the request, wherein the determination of the first data provider occurs prior to providing a voice response to the voice input to the user device, and wherein each of the plurality of suggested dialog responses is associated with a respective context;
scoring the plurality of suggested dialog responses to generate a respective score for each suggested dialog response based on one or more scoring factors including the respective contexts for the plurality of suggested dialog responses;
determining, from the plurality of suggested dialog responses, a particular dialog response to provide to the user responsive to the voice input of the request based on the scoring;
synthesizing a voice response that corresponds to the determined dialog response;
providing the voice response to the user device; and
performing the task in response to completing the dialog.

2. The method of claim 1, comprising:
updating a state of a dialog based on the determined dialog response.

3. The method of claim 1, comprising converting the voice input request to text prior to submitting the request to the plurality of data providers.

4. The method of claim 1, wherein performing the task in response to completing the dialog comprises:
determining if the dialog requires further responses from the user device based on the dialog state and in response to determining that no further responses are required, performing the task requested by the user.

5. The method of claim 1, wherein each data provider independently analyzes the request according to the data model associated with the data provider.

6. The method of claim 1, wherein in response to determining that none of the respective scores for the plurality of suggested dialog responses satisfy a threshold amount, synthesizing a response to provide to the user device to ascertain the user intent.

7. The method of claim 1, wherein determining a particular dialog response to provide to the user based on the scoring includes disqualifying a suggested dialog response having a score that is lower than a threshold amount and also disqualifying all suggested dialog responses that refer to the suggested dialog response.

8. The method of claim 1, comprising:
receiving a second voice input associated with the task from the user device;
submitting the second voice input to each of a plurality of distinct data providers;
determining a second dialog response to provide to the user responsive to the second voice input based on the suggested dialog responses generated by the plurality of distinct data providers;
providing the second dialog response to the user device; and
updating the state of the dialog.

9. A system comprising:
one or more computers configured to perform operations comprising:
receiving a request, from a user device, made by a user to perform a task, wherein the request comprises voice input of a user of the user device;
determining a dialog associated with the task, wherein the dialog has a particular state;
submitting the voice input of the request to each of a plurality of distinct data providers, wherein each data provider is associated with a distinct data model configured to interpret particular types of voice inputs;
in response to the voice input, receiving a plurality of suggested dialog responses to the voice input from two or more of the data providers including a first data provider and a second data provider, wherein the first data provider determines whether to change a first suggested dialog response of the first data provider that is responsive to the voice input of the request based on a second suggested dialog response of the second data provider that is responsive to the voice input of the request, wherein the determination of the first data provider occurs prior to providing a voice response to the voice input to the user device, and wherein each of the plurality of suggested dialog responses is associated with a respective context;
scoring the plurality of suggested dialog responses to generate a respective score for each suggested dialog response based on one or more scoring factors including the respective contexts for the plurality of suggested dialog responses;
determining, from the plurality of suggested dialog responses, a particular dialog response to provide to the user responsive to the voice input of the request based on the scoring;
synthesizing a voice response that corresponds to the determined dialog response;
providing the voice response to the user device; and
performing the task in response to completing the dialog.

10. The system of claim 9, wherein the operations further comprises updating a state of a dialog based on the determined dialog response.

11. The system of claim 9, wherein the operations further comprises converting the voice input request to text prior to submitting the request to the plurality of data providers.

12. The system of claim 9, wherein performing the task in response to completing the dialog comprises:
determining if the dialog requires further responses from the user device based on the dialog state and in response to determining that no further responses are required, performing the task requested by the user.

13. The system of claim 9, wherein each data provider independently analyzes the request according to the data model associated with the data provider.

14. The system of claim 9, wherein in response to determining that none of the respective scores for the plurality of suggested dialog responses satisfy a threshold amount, synthesizing a response to provide to the user device to ascertain the user intent.

15. The system of claim 9, wherein determining a particular dialog response to provide to the user based on the scoring includes disqualifying a suggested dialog response having a score that is lower than a threshold amount and also disqualifying all suggested dialog responses that refer to the suggested dialog response.

16. One or more non-transitory computer-readable storage media encoded with instructions that, when executed by one or more computers, cause the one or more computers to perform operations comprising:
receiving a request, from a user device, made by a user to perform a task, wherein the request comprises a voice input of a user of the user device;
submitting the request to each of a plurality of distinct data providers, wherein each data provider is associated with a distinct data model configured to interpret particular types of voice inputs;
in response to the voice input, receiving a plurality of suggested dialog responses to the voice input from two or more of the data providers including a first data provider and a second data provider, wherein the first data provider determines whether to change a first suggested dialog response of the first data provider that is responsive to the voice input of the request based on a second suggested dialog response of the second data provider that is responsive to the voice input of the request, wherein the determination of the first data provider occurs prior to providing a voice response to the voice input to the user device, and wherein each of the plurality of suggested dialog responses is associated with a respective context;
scoring the plurality of suggested dialog responses to generate a respective score for each suggested dialog response based on one or more scoring factors including the respective contexts for the plurality of suggested dialog responses;

determining, from the plurality of suggested dialog responses, a particular dialog response to provide to the user responsive to the voice input of the request based on the scoring;

synthesizing a voice response that corresponds to the determined dialog response;

providing the voice response to the user device; and performing the task in response to completing the dialog.

17. The one or more computer-readable storage media of claim 16, wherein the operations further comprises: updating a state of a dialog based on the determined dialog response.

18. The one or more computer-readable storage media of claim 16, wherein the operations further comprises converting the voice input request to text prior to submitting the request to the plurality of data providers.

19. The one or more computer-readable storage media of claim 16, wherein performing the task in response to completing the dialog comprises:

determining if the dialog requires further responses from the user device based on the dialog state and in response to determining that no further responses are required, performing the task requested by the user.

20. The one or more computer-readable storage media of claim 16, wherein each data provider independently analyzes the request according to the data model associated with the data provider.

21. The one or more computer-readable storage media of claim 16, wherein determining a particular dialog response to provide to the user based on the scoring includes disqualifying a suggested dialog response having a score that is lower than a threshold amount and also disqualifying all suggested dialog responses that refer to the suggested dialog response.

* * * * *